United States Patent
Tan et al.

(10) Patent No.: US 7,925,168 B2
(45) Date of Patent: Apr. 12, 2011

(54) OPTICAL INTERCONNECT SYSTEM PROVIDING COMMUNICATION BETWEEN COMPUTER SYSTEM COMPONENTS

(75) Inventors: Michael Renne Ty Tan, Menlo Park, CA (US); Terrel Morris, Garland, TX (US); Norman Paul Jouppi, Palo Alto, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

(21) Appl. No.: 11/873,325

(22) Filed: Oct. 16, 2007

(65) Prior Publication Data

US 2009/0097851 A1    Apr. 16, 2009

(51) Int. Cl.
*H04B 10/00*    (2006.01)
(52) U.S. Cl. ........................................................ 398/164
(58) Field of Classification Search .................... 398/164
See application file for complete search history.

(56) References Cited

U.S. PATENT DOCUMENTS

| 5,416,861 | A | 5/1995 | Koh et al. |
| 6,715,018 | B2 | 3/2004 | Farnworth et al. |
| 6,793,408 | B2* | 9/2004 | Levy et al. ................... 385/88 |
| 7,099,585 | B2* | 8/2006 | Cordes et al. ................ 398/60 |
| 7,139,481 | B2 | 11/2006 | Furuyama |
| 7,414,793 | B2* | 8/2008 | Cianciotto ................... 359/634 |
| 2002/0178319 | A1 | 11/2002 | Sanchez-Olea |
| 2003/0205065 | A1* | 11/2003 | Matsuura et al. ............. 65/393 |
| 2004/0126065 | A1 | 7/2004 | Levy et al. |
| 2005/0078902 | A1 | 4/2005 | Beausoleil et al. |
| 2005/0276604 | A1 | 12/2005 | Morrow et al. |
| 2007/0081255 | A1* | 4/2007 | Cianciotto et al. .......... 359/627 |

FOREIGN PATENT DOCUMENTS

JP    10-283301 A    10/1998

OTHER PUBLICATIONS

Tan, Michael et al, "A High Speed Optical Multi-drop Bus for Computer Interconnections", 16th IEEE Symposium on High Performance Interconnects, Sep. 3, 2008, pp. 3-10.

* cited by examiner

*Primary Examiner* — Agustin Bello

(57) ABSTRACT

An optical interconnect system for communication between computer system components is described. The system includes an optical data communication path and a plurality of optical taps, each optical tap optically coupling a respective computer system component to the optical data communication path. Each optical tap splits power from an optical signal received from the data communication path or from a light source generating a data signal from its associated computer component resulting in another optical signal. Each optical tap splits light in accordance with a respective power ratio relationship between reflectivity and transmissivity. The ratio relationships of the optical taps together provide a predetermined communication reliability metric for signals traversing the optical interconnect system between computer system components.

16 Claims, 4 Drawing Sheets

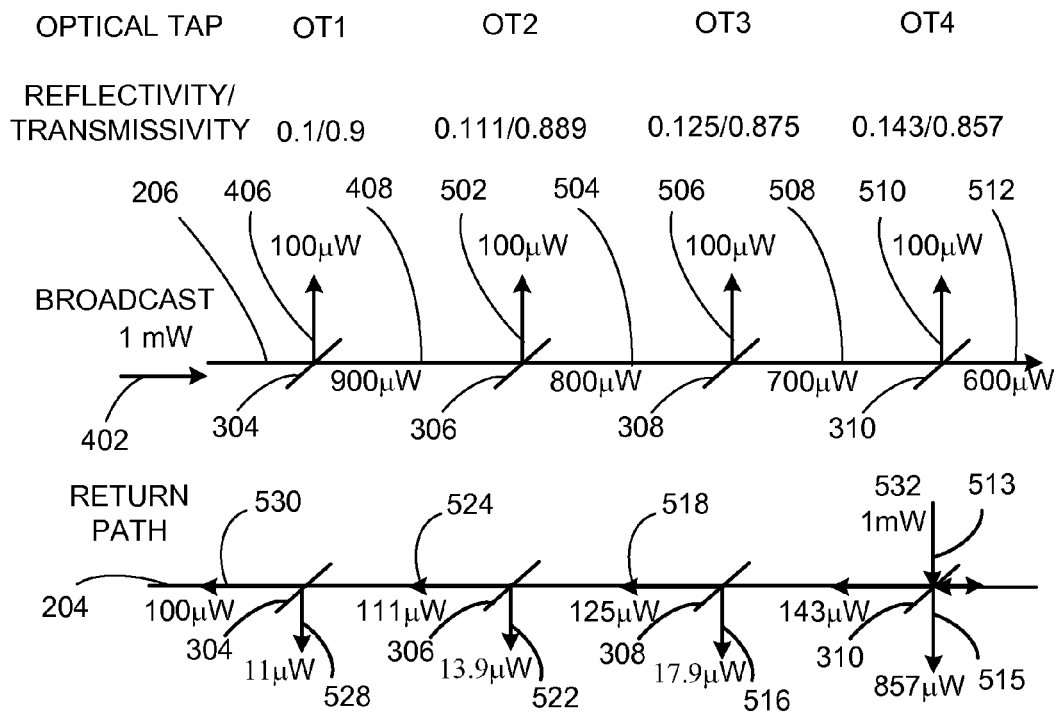

| A first tap removing the same amount of power as a second tap from a signal received from the optical data communication path which signal is traveling in one direction on the path in accordance with the first tap's power ratio relationship. | 602 |

↓

| The first tap passing through on the optical data communication path the remainder of the broadcast signal as an optical signal with a second power, the second power also being determined by the first tap's power ratio relationship | 604 |

↓

| The first tap removing a different amount of power than a second tap from a pass through signal received from the optical data communication path which is traveling in an opposite direction in accordance with the first tap's same ratio relationship. | 606 |

FIG. 6

OPTICAL INTERCONNECT SYSTEM PROVIDING COMMUNICATION BETWEEN COMPUTER SYSTEM COMPONENTS

TECHNICAL FIELD

The present invention relates generally to an optical interconnect which provides communication between computer system components. For example, the optical interconnect provides optical communication between a memory controller and memory devices.

BACKGROUND ART

Electrical communication architectures struggle to balance the dichotomy for increased performance required of electronic systems while addressing lower power consumption, smaller form factor, and lower electromagnetic emissions. Better solutions dealing which address scalability while reducing power consumption in computer systems is desirable. A memory system is an example of a typical computer system in which such better solutions are desirable.

Some current computer memory systems use a wide parallel bus to communicate with bulk memory. With increasing memory densities and memory bus speeds, the bus widths and speeds must also be increased. This parallel bus architecture has reached a point where it can no longer scale with the demands of current and future multi-core microprocessors.

In a typical example of bulk memory using Dual In-line Memory Module (DIMM) technology with a series of Dynamic Random Access Memory (DRAM) integrated circuits in each DIMM mounted on a printed circuit board (PCB), the electrical problem of scaling the high-speed parallel bus to wider widths and speeds limit the maximum number of DIMMs per channel. For example, DDR3 channels which can operate up to an effective clock rate of 400-800 MHz can only support a single DIMM.

An alternative technology, the Fully Buffered DIMM (FB-DIMM) addressed this scalability issue by replacing the wide parallel bus with narrow serial point-to-point links between the memory controller and an intermediate memory buffer within each FBDIMM module. This intermediate memory buffer called an Advanced Memory Buffer (AMB) communicates with the memory controller, and also replicates and forwards data to an adjacent AMB in the next FBDIMM. The AMB is also responsible for converting the serialized data to the parallel data needed to communicate with the DRAMs. The serial interface is split into two uni-directional buses, one southbound for command, address and write data and one northbound for read data. However, the daisy chaining or point-to-point configuration is problematic as the hops introduce latency. The need to replicate and forward both northbound and southbound signals adds latency, eventually leading to bottlenecks. The AMBs also consume a large amount of power due to the need to send the high speed electrical signals between AMBs and the serialization and deserialization of data from the DIMMs. A multicast or broadcast architecture would be more desirable.

These examples illustrate that, as the speed of communication in electrical systems has increased, signal integrity issues have limited electrical communication memory interconnects to point-to-point interconnects. What is desired is a low power system providing high speed interconnects that maintains signal integrity and which can also support lower latency topologies with multiple receivers (fan-out) connected to one or more drivers, or systems with multiple drivers (fan-in) connected to one or more receivers. Such qualities are desired in other types of computer systems as well.

SUMMARY

The present invention provides one or more embodiments of an optical interconnect system for communication between computer system components. In one embodiment, the optical interconnect system comprises an optical data communication path and a plurality of optical taps, each optical tap optically coupling a respective computer system component to the optical data communication path. Each optical tap splits power of a signal received from either the optical data communication path or its respective computer component into an optical signal having a first power and an optical signal having a second power in accordance with a respective power ratio relationship between reflectivity and transmissivity. The ratio relationships of the optical taps together provide a predetermined communication reliability as determined by a metric for signals traversing the optical interconnect system between computer system components.

In one example, each tap removes about the same power from a broadcast signal received from the optical data communication path in accordance with its power ratio relationship to produce the optical signal with the first power which is sent to its associated computer. Each tap passes through on the optical data communication path the remainder of the broadcast signal as the optical signal with a second power which is determined by the tap's power ratio relationship. The ratio relationship at each tap is such that an optical receiver for a destination computer system component receives the same amount of power in a signal independent of from which light source for the sender component generated the signal.

Certain embodiments of the invention have other aspects in addition to or in place of those mentioned or obvious from the above. The aspects will become apparent to those skilled in the art from a reading of the following detailed description when taken with reference to the accompanying drawings.

BRIEF DESCRIPTION OF THE DRAWINGS

FIG. 5 is an illustrative view of an exemplary power distribution of the optical interconnect system illustrated in FIG. 3;

FIG. 6 is a flow chart of a method of communication between computer system components using an optical interconnect system in an embodiment of the present invention;

DETAILED DESCRIPTION

Figure 1A:
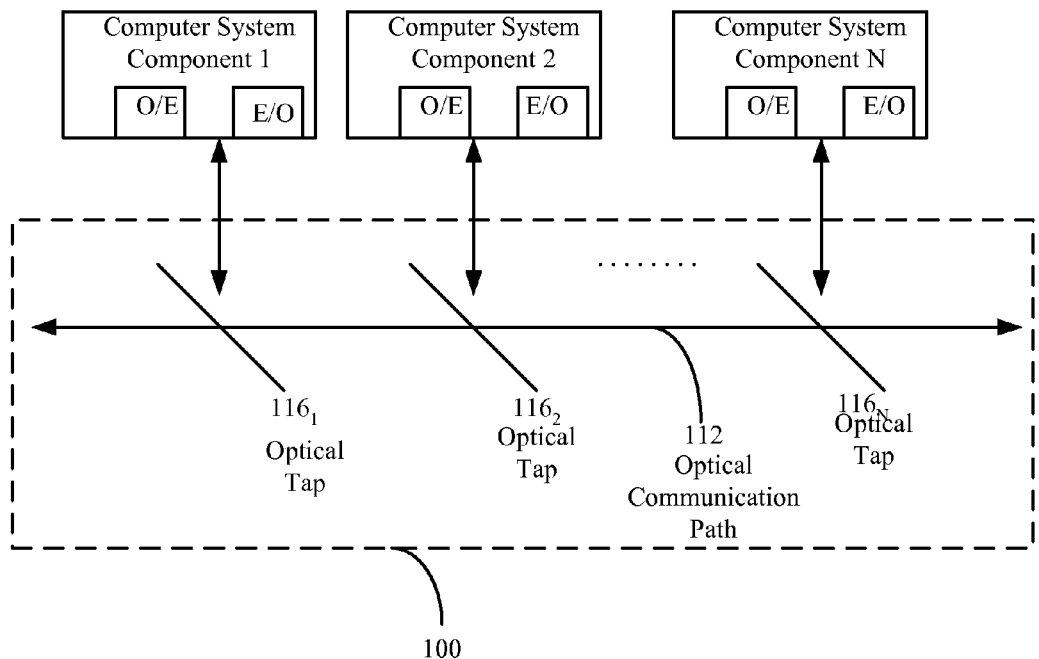
FIG. 1A is a block diagram view of an optical interconnect system for providing optical communication between computer system components in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. The drawings showing embodiments of the system are semi-diagrammatic and not to scale and, particularly, some of the dimensions are for the clarity of presentation and are shown greatly exaggerated in the drawing FIGs.

In addition, where multiple embodiments are disclosed and described having some features in common, for clarity and ease of illustration, description, and comprehension thereof, similar and like features one to another will ordinarily be described with like reference numerals. The embodiments have been numbered first embodiment, second embodiment, etc. as a matter of descriptive convenience and are not intended to have any other significance or provide limitations for the present invention.

FIG. 1A is a block diagram view of an optical interconnect system 100 for providing optical communication between computer system components in accordance with an embodiment of the present invention. The optical interconnect system 100 comprises one or more optical data communication paths 112 and a plurality of optical taps $116_1$ to $116_N$, each optical tap for optically coupling a respective computer system component to the optical data communication path. As shown, optical to electrical conversion can be performed for signals received by the component from the optical tap, and electrical to optical conversion can be performed for signals from the computer component to be optically coupled onto the data path by the tap. An optical data communication path is often referred to as an optical interconnect in this specification. The optical communication path can be implemented in various ways. Examples of the optical waveguides which can be used include polymeric, glass, or light pipes including hollow metal waveguides.

A substantial improvement over traditional optical waveguides formed using polymers or dielectric materials is the use of a large core hollow waveguide configured to guide coherent light. The large core hollow waveguide can have a diameter (or width and/or height) on the order of 50 to 150 or more times a wavelength of the coherent light the waveguide is configured to guide. The large core hollow waveguide can have a cross-sectional shape that is square, rectangular, round, elliptical, or some other shape configured to guide an optical signal. Furthermore, because the waveguide is hollow, the light essentially travels at the speed of light in air or a vacuum. (See U.S. patent application Ser. No. 11/832,559 entitled "System And Method For Routing Optical Signals" with inventors Michael Renne Ty Tan and Shih-Yuan Wang filed Aug. 1, 2007 for more information, and this application Ser. No. 11/832,559 is hereby incorporated by reference.)

Pellicle beam splitters can be used as the optical taps in combination with hollow metal waveguides implementing the optical interconnects. The thinness of the pellicle beam splitter minimizes beam walk-off so that the incident beam remains essentially on-axis when it passes through the pellicle beam splitter providing nice guidance of the beam through the hollow portion of the subsequent hollow metal waveguides. In a thick plate beam splitter, the beam is diverted from its path on incidence in the thickness of the material so that more of the pass through signal hits the metal walls rather than the hollow portion and suffers high loss due to the finite reflectivity of the metal coating.

Each tap diverts about the same amount of power from a broadcast signal received from the optical data communication path in accordance with its power ratio relationship. The diverted optical signal is sent to its associated computer component, and each tap passes through on the optical data communication path the remainder of the broadcast or multicast signal which has a power determined by the tap's respective power ratio relationship.

The ratio relationship at each tap can also be such that an optical receiver for a destination computer system component receives the same amount of power in a signal independent of from which other computer system component coupled to the interconnect 112 sends the signal. For example, the power received by the destination optical receiver is independent of the optical distance of the light source that sent it via the optical data communication path.

In a system designed to preserve power consumption, the optical taps are preferably passive optical beam splitters.

Figure 1B:
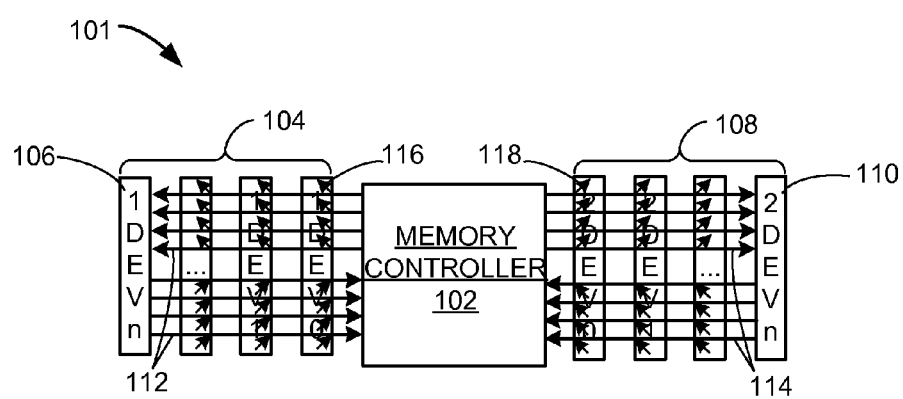
FIG. 1B is a block diagram view of an illustrative computer system of components communicatively coupled via an optical interconnect system in accordance with an embodiment of the present invention.

Referring now to FIG. 1B, therein is shown a block diagram view of an illustrative computer system 101 of components, a memory system or sub-system, communicatively coupled via an optical interconnect system in accordance with an embodiment of the present invention. The computer system 101 includes a memory controller 102 connected to a first bank 104 of first memory devices 106 and a second bank 108 of second memory devices 110. The memory controller 102 may be included in an integrated circuit having other functions, such as a processor, or may interface to other integrated circuits (not shown), or a combination thereof. The memory controller 102 also can also perform electrical to optical (E/O) and optical to electrical (O/E) conversions.

For illustrative purposes, the computer system 101 is shown with the memory controller 102 and the first memory devices 106, although it is understood that the computer system 101 may have other devices of different functions, such as other processing units or interface devices. Also for illustrative purposes, the memory controller 102, the first memory devices 106, or a combination thereof may include an intra-chip optical interconnect. As a different example, the first memory devices 106 may be different from one another and not all the first memory devices 106 may necessarily perform substantially the same type of function or may be implemented with substantially the same technology.

The first bank 104 includes a first optical interconnect 112, such as an optical waveguide, for communication from the memory controller 102 to and through the first memory devices 106 and back to the memory controller 102. For illustrative purposes, the computer system 101 is shown with the first optical interconnect 112 connecting the memory controller 102 and the first memory devices 106. In this embodiment, the first optical interconnect 112 is formed with unidirectional optical interconnects (e.g., ingress and egress, northbound and southbound, etc.) providing communication paths in opposite directions. In one example, a different optical waveguide may be used for each direction. The memory controller 102 or one of the first memory devices 106 communicates with another of the first memory devices 106 that is not physically adjacent to it by the in between first memory devices 106 passing through the received information along the respective light stream in the first optical interconnect 112.

As a different example, the first optical interconnect 112 may also provide bi-directional communication between the memory controller 102 and the first memory devices 106 through a single bi-directional optical path. In one example, this can be done through the use of different wavelengths with at least one wavelength used for broadcasting and at least a further wavelength used for receiving.

The ratio relationship between reflectivity and transmissivity for each optical tap 116 in the optical interconnect system 100 is set in the computer system 101 so that the memory controller 102 and the first memory devices 106 can achieve a predetermined communication reliability and for minimizing the power consumption. In a computer system example, a bit error rate (BER) of $<10^{-12}$ suffices as an acceptable metric for the predetermined communication reliability. The optical receiver sensitivity can be used to determine the minimum average optical power needed for a given bit error-rate. Optical receiver sensitivities of around −17 dBm (20 microwatts) at 10 Gb/s have been demonstrated, while −15 dBm (32 microwatts) is more typical for BER $<10^{-15}$.

Light speed or near light speed transmission over the first optical interconnect 112 places challenges for reliably performing the fault sensing described above. For example, the memory controller 102 may be required to discern increments of approximately 150-160 picoseconds for delta time of flight between the first memory devices 106 considering the physical length of the first optical interconnect 112, the speed of light, and the accuracy required to discriminate data returning from the each of the first memory devices 106 on the same channel of the first optical interconnect 112. However, these increments are typically smaller or in some cases half of the output uncertainty (clock to out) for each driver.

In order to mitigate the differences between the increments and the output uncertainty described above, a training pattern may be used over each channel of the first optical interconnect 112 where the sender is known for each transfer, which allows adjustment of the timing of the received data. The timing can then be adjusted within the memory controller 102 using timing adjustment techniques. With the timing relationship established, normal data transfers may be initiated over the first optical interconnect 112. The timing adjustment may increase the maximum operating frequency of the first optical interconnect 112 beyond normal operating frequencies of the first memory devices 106 potentially allowing over-clocking the first memory devices 106.

The ratio relationships between reflectivity and transmissivity for each optical tap 116 are determined such that the power distribution to each of the memory devices 106, and the memory controller 102 receives a predetermined power. The predetermined power can be substantially the same amount of power, ensuring a predetermined communication reliability. Typically, the optical tap ratios would be determined using ray trace modeling of the target system to satisfy the communication reliability metric for the system and minimizing power consumption. In addition to the ratios, the laser powers, optical receiver sensitivities, optical distance between sources and receivers, loss characteristics of the optical path are examples of other considerations to be accounted for in the ray trace modeling. In one example, an iterative algorithm adjusting the various considerations is used to model the optical interconnect system 100 until a desired communication reliability metric is achieved. Then the ratios would be set for the optical taps during manufacturing and/or assembly for the target computer system (e.g. 101). In some instances, some adjustment of optical elements that effect power use or distribution among particular elements in the computer system can be done during operation of the system. For example, an insertion or removal of one of the first memory devices 106 may invoke the optically interconnect computer system 101 to adjust the communication between the first memory devices 106 with the memory controller 102 for establishing a balance between the predetermined communication reliability and power consumption.

For illustrative purposes, the computer system 101 is shown having the first optical interconnect 112, although it is understood that the computer system 101 may have other interconnects, such as optical and electrical. Also for illustrative purposes, the computer system 101 is shown having the memory controller 102 and the first memory devices 106, although it is understood that the computer system 101 may have other components (not shown) or parts (not shown) that may be connected or not connected to the first optical interconnect 112.

Similarly, the second bank 108 includes a second optical interconnect 114, such as an optical waveguide, for communication from the memory controller 102 to and through the second memory devices 110 and back to the memory controller 102. Optical taps 118 optically couple the memory devices 110 to the second optical interconnect 114. The functions, attributes, and features described for the first bank 104 and the first optical interconnect 112 applies to the second bank 108 and the second optical interconnect 114. As well for illustrative purposes, the second bank 108 depicts the same number of the second memory devices 110 as the first memory devices 106 in the first bank 104, although it is understood that the first bank 104 and the second bank 108 may have any number of memory devices and may not be the same number.

The computer system 101 may utilize the first bank 104 and the second bank 108 in a number of ways. For example, the first bank 104 and the second bank 108 may provide cumulative memory capacity, provide striped memory for added performance, or provide redundant and fail-over memory for a fault tolerant memory architecture.

The first memory devices 106 and the second memory devices 110 connect with or include devices for performing optical to electrical (O/E) conversion and vice versa for signals to and from their respective optical taps 116 118 which couple the optical signals to the first optical interconnect 112 and the second optical interconnect 114, respectively, with a predetermined optical power.

Figure 2:
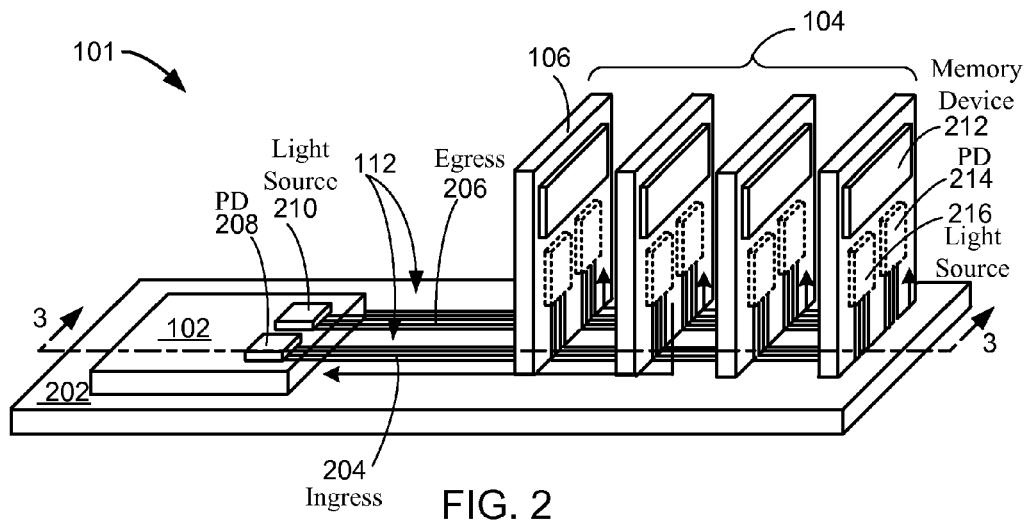
FIG. 2 is an isometric view of a portion of the system of FIG. 1.

Referring now to FIG. 2, therein is shown an isometric view of a portion of the optically interconnected computer system 101. The isometric view depicts the memory controller 102 mounted over a carrier 202, such as a printed circuit board. The memory controller 102 connects with the first memory devices 106 of the first bank 104 through the first optical interconnect 112. For illustrative purposes, the isometric view depicts the first bank 104, although it is understood that the isometric view may depict the second bank 108.

As mentioned in FIG. 1, the first optical interconnect 112 provides the communication from the memory controller 102 to and through the first memory devices 106 and back to the memory controller 102. The first optical interconnect 112 provides the communication with ingress optical interconnects 204, such as a northbound optical interconnects, and egress optical interconnects 206, such as southbound optical interconnects. The "ingress" and "egress" terms are relative to the memory controller 102. The ingress optical interconnects 204 carry information, such as command, data, or status, into the memory controller 102. The egress optical interconnects 206 carry information, such as command, data, or status, from the memory controller 102.

For illustrative purposes, the optically interconnected computer system 101 is described with the first optical interconnect 112 providing the communication with the ingress optical interconnects 204 and the egress optical interconnects 206, although it is understood that the first optical interconnect 112 may provide the communication without dedicating the ingress optical interconnects 204 and the egress optical interconnects 206 for communication in each direction.

For example, the first optical interconnect 112 may provide the communication between the first memory devices 106 and the memory controller 102 using the same optical waveguide path for both "ingress" and "egress" optical communication. This is achieved with predetermined optical wavelengths with one or more of the predetermined wavelengths used for "ingress" communication and a further one or more of the predetermined wavelengths used for "egress" communication.

As an example, the memory controller 102 includes electrical interconnects (not shown) such that the memory controller 102 performs an optical to electrical (O/E) and an electrical to optical (E/O) conversions. The memory controller 102 includes a controller photo-detector 208, such as a photodiode, connected with the ingress optical interconnects 204 preferably through some microoptics and a controller light source 210, such as a laser, connected to the egress optical interconnects 206 preferably through some microoptics. For illustrative purposes, the memory controller 102 is described performing O/E and E/O conversions at its interface to the first optical interconnect 112, although it is understood that the memory controller 102 may provide an optical connection with the first optical interconnect 112 without performing the O/E and the E/O conversions.

The first memory devices 106 are plug in cards connected to the carrier 202 establishing connections with the ingress optical interconnects 204 and the egress optical interconnects 206.

Each of the first memory devices 106 includes memory devices 212, wherein the memory devices 212 are coupled to a memory photo-detector 214, such as a photo-diode, and a memory light source 216, such as a laser diode. The memory photo-detector 214 and the memory light source 216 are depicted by dotted lines signifying that the memory photo-detector 214 and the memory light source 216 are not included in this example in the first memory devices 106 but are connected to the first memory devices 106. In other implementation examples, they can be included in the memory devices.

The memory photo-detector 214 connects with the egress optical interconnects 206. The memory light source 216 connects with the ingress optical interconnects 204. For illustrative purposes, the first memory devices 106 are described performing O/E and E/O conversions to and from the memory devices 212, although it is understood that the first memory devices 106 may not perform such conversions. For example, the memory devices 212 may provide an optical interface to connect with the first optical interconnect 112.

In one example, the first memory devices 106 are attached through an electrical interface between the memory devices 212 and the memory photo-detector 214 and between the memory devices 212 and the memory light source 216. In this case, the memory photo-detector 214 and the memory light source 216 can be mounted onto the carrier 202 together with the first optical interconnect 112.

The memory devices 212 may include a number of memory technologies. For example, the memory devices 212 may include volatile random access memory (RAM) such as dynamic random access memory (DRAM) or static random access memory (SRAM). As another example, the memory devices 212 may include non-volatile memory such as non-volatile random access memory (NVRAM) or read only memory (ROM).

The memory controller 102 broadcasts or multi-casts information, such as command, data, or status, over the egress optical interconnects 206 to the first memory devices 106. The egress optical interconnects 206 carries the broadcasted information to and through the first memory devices 106 to the last one connected at the end of the egress optical interconnects 206. Each of the first memory devices 106 may transmit information over the ingress optical interconnects 204 through the first memory devices 106 between the one transmitting and the memory controller 102.

As another example of an adjustment to achieve the predetermined communication reliability and to minimize power consumption, the pass-through feature of the first memory devices 106 may be adjusted, as will be described in more detail later. In another example, the memory light source 216 may be implemented or adjusted by distributing the power to the first memory devices 106 and for the optical characteristics of the egress optical interconnects 206 with the first memory devices 106. In yet another example, the memory light source 216 is preferably implemented or adjusted for communication to the memory controller 102. In yet a further example, the memory devices 212 may be implemented or adjusted for short-range electrical communication within each of the first memory devices 106 further reducing the power consumption of the optically interconnected memory system 101.

Figure 3:
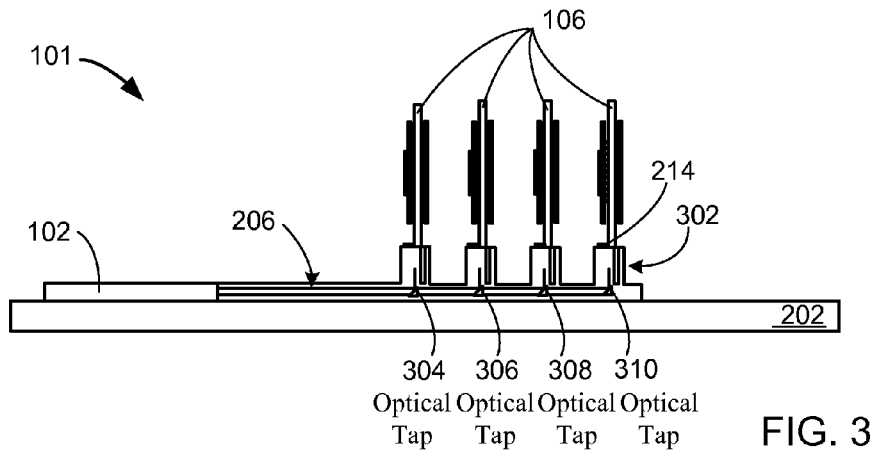
FIG. 3 is a cross-sectional view of the system along line 3-3 of FIG. 2.

Referring now to FIG. 3, therein is shown a cross-sectional view of the optically-interconnected memory system 101 along line 3-3 of FIG. 2. The cross-sectional view depicts the memory controller 102 mounted over the carrier 202. Each of the first memory devices 106 is inserted into a connector 302. The connector 302 is mounted over the carrier 202.

The egress optical interconnects 206 connects the memory controller 102 with the first memory devices 106 through a first optical tap 304, a second optical tap 306, a third optical tap 308, and a fourth optical tap 310, wherein one of the optical taps is under the connector 302. In this embodiment, the first optical tap 304 is the optical tap first traversed by the egress optical interconnects 206 from the memory controller 102 and the fourth optical tap 310 is the last one.

The chain of optical taps is adjusted or is adjustable such that the optical energy from the memory controller 102 is distributed to the first memory devices 106 by the first optical tap 304 through the fourth optical tap 310, as described in more detail later. For illustrative purposes, one of the optical taps is described under the connector 302, although it is understood that the optical taps may be included in the connector 302. The number of the optical taps for the system 100 depends partially on the receiver sensitivity and the input optical power from the memory controller 102. For example, eight optical taps are achievable with an input power of 1 mW and a receiver sensitivity of −13 dBm.

The memory photo-detector 214 and the memory light source 216 of FIG. 2 preferably together with its microoptics are included with the connector 302. The memory photo-detector 214 and the memory light source 216 of FIG. 2, as an example, may be mounted over the carrier 202 instead of the connector 302.

The optically interconnected computer system 101 may be implemented with the carrier 202 mounted over a further carrier (not shown), such as a printed circuit board. The carrier 202 having the first memory devices 106, the memory controller 102, the optical taps 116, and the first optical interconnect 112 of FIG. 2 may be provided as a subsystem, a daughter card, or a mezzanine card and interfacing with the rest of a computer system (e.g., processor and bus) through a predetermined interface (not shown), such as an electrical or optical interface.

Figure 4:
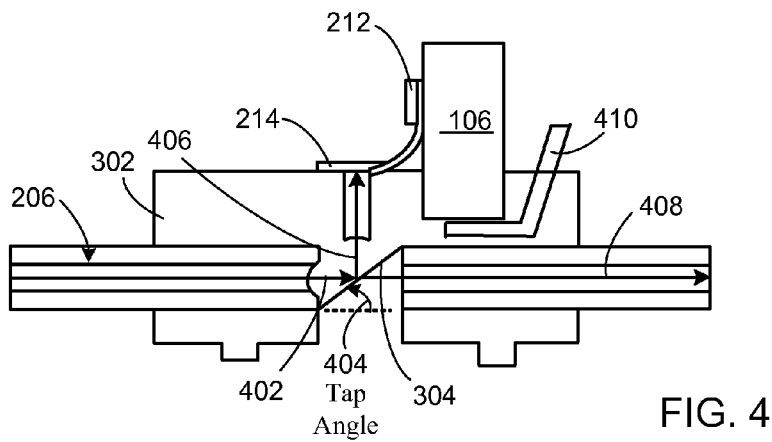
FIG. 4 is a more detailed cross-sectional view of one of the first memory devices and the first optical tap.

Referring now to FIG. 4, therein is shown a more detailed cross-sectional view 400 of one of the first memory devices 106 and the first optical tap 304. The more detailed cross-sectional view 400 depicts the first optical tap 304 in a path of a first input light 402 from the memory controller 102 of FIG. 2.

The first optical tap 304 at an angle 404, such as a 45° angle, splits the first input light 402 denoted as variable $P_0$. The first optical tap 304, with reflectivity of $R_1$ and a transmissivity of $T_1$, reflects a portion of the first input light 402 to one of the first memory devices 106 inserted in the connector 302. The reflected portion is a first reflected light 406 denoted as a variable $P_r = P_0 * R_1$. A portion of the first input light 402 that passes through the first optical tap 304 is transmitted to the second optical tap 306 of FIG. 3 through the fourth optical tap 310 of FIG. 3. It is understood that the number of the optical taps may be limited by the receiver sensitivity and the power of the first input light 402 or $P_0$.

The transmitted portion is a first transmitted light 408 denoted as a variable $P_t = P_0 * T_1$. The first optical tap 304 provides the optical characteristics following the relationship $P_0 = P_r + P_t + loss$. The "loss" may include optical loss from the first optical tap 304 and from the optical path in the egress optical interconnects 206. Ideally, the loss should be kept as small as possible such that $R_1 + T_1 \sim 1$.

The optical interconnect system 100 is adjusted or is adjustable by setting or adjusting $P_0$, $P_r$, $P_t$, or a combination thereof. For example, if the connector 302 with the first optical tap 304 is not populated, the first optical tap 304 may be adjusted to minimize or to zero out the $P_r$ contribution. This would allow the memory controller 102 to reduce the energy of the first input light 402 thereby reducing the power consumption of the computer memory system 101 of FIG. 3.

In addition, the optical taps, individually and collectively, from the first optical tap 304 through the fourth optical tap 310 may be designed or adjusted such that the power consumption of the optical memory system 101 is minimized or reduced while providing the same amount of received power to each of the first memory devices 106 resulting in a predetermined communication reliability or BER. This may be accomplished by designing the optical characteristics of the optical taps with the first optical interconnect 112 of FIG. 2 and with the graded or ratio relationships of the optical characteristic between the optical taps, to be described more in FIG. 5.

Also, the minimum power consumption is determined by the sensitivity of the O/E electronics, such as the memory photo-detector 214. For example, for a given optical power from the first input light 402 and a given receiver sensitivity in the memory photo-detector 214, a number of optical fan-outs may be determined or calculated. The power consumption of the optically interconnected computer system 101 may be further reduced by not activating or not powering the O/E electronics, such as the memory photo-detector 214, when a connector 302 is not populated.

The first optical tap 304 as well as the other optical taps may be adjusted in a number of ways. For example, the optically interconnected memory system 100 may be configured having the connector 302 at the location of the first optical tap 304 depopulated. In this case, the first optical tap 304 may also be depopulated. In another example, the angle 404 of the first optical tap 304 may be adjusted to decrease or zero out the reflected power $P_r$. This may also include adjusting the angle 404 such that the first optical tap 304 is not in the path of the first input light 402.

In yet another example, the angle 404 of the first optical tap 304 as well as the others may be affected by the mechanical insertion of one of the first memory devices 106 in the connector 302. The insertion would adjust the angle 404 of the first optical tap 304 to be in the path of the first input light 402. The connector 302 that is not populated provides the angle 404 to remove the first optical tap 304 from the path of the first input light 402 or minimize $P_r$. The adjustment of the angle 404 of the first optical tap 304 notifies the memory controller 102 if the location with the first optical tap 304 is populated or not. This notification can allow the memory controller 102 to adjust the energy of the first input light 402.

The angle 404 may be adjusted in a number of ways. For example, the connector 302 may include an adjustment device 410, such as a locking arm, that may be used to connect and hold one of the first memory devices 106 in the connector 302. The position or setting of the adjustment device 410 may set the angle 404 of the first optical tap 304 and provide the appropriate notification to the memory controller 102. The adjustment device 410 is preferably not in the optical path. In a modified example, the adjustment device 410 may not change the angle 404 but instead remove, such as slide, the first optical tap 304 from the optical path.

An example of the notification to the memory controller 102 may include the adjustment device 410 in an inserted position sets a reference voltage, such as ground, to an input of the memory controller 102. The adjustment device 410 in a depopulated position may set a different reference voltage to that in the inserted position or let the reference input to the memory controller 102 float.

The adjustment device 410 may be implemented in other ways. For example, the adjustment device 410 may include microelectromechanical systems (MEMS) or electrically controlled reflectivity of the optical taps. The adjustment device 410, as examples, may also include mechanical structures, electrical structures, or combination thereof which may cooperate with software or firmware.

The first optical tap 304, as well as the second optical tap 306, the third optical tap 308 of FIG. 3, and the fourth optical tap 310 may be implemented in a number of ways. For example, the first optical tap 304 as well as the other optical taps may be implemented with pellicle beam splitters with suitable optical coatings so as to yield a predetermined amount of reflectivity, transmissivity, and known optical loss. Preferably, the beam splitter optical coatings used should be non-polarizing so as to minimize any differences between the reflectivity/transmissivity as a function of input polarization of light. Pellicle beam splitters minimize or eliminate ghosting or beam walk-off issues. As another example, the first optical tap 304, as well as the other optical taps, may be implemented with optical scatterers or optical splitters of various sizes and geometric configurations, such as a triangular or a diamond shape. As another example, the first optical tap 304 may be implemented with sub-wavelength metallic structures which reflect and transmit the desired light. The amount of reflectance and transmittance can be approximately estimated by the "fill factor" of the metallized to unmetallized regions.

The reflected portion of the first input light 402 is transmitted to the memory photo-detector 214. The memory photo-detector 214 converts the optical reflected light to an electrical signal for the memory device 212.

As described earlier, the first optical interconnect 112 may provide the communication using the same optical waveguide path for both "ingress" and "egress" optical communication. This is achieved with predetermined optical wavelengths with one or more of the predetermined wavelengths used for "ingress" communication and a further one or more of the predetermined wavelengths used for "egress" communication. Within the first memory devices 106, a wavelength selective element (not shown), such as a dichoric filter, may separate and identify the direction of the communication. The optical tap precedes the wavelength selective element.

Referring now to FIG. 5, therein is shown an illustrative view of an exemplary power distribution of the optical interconnect system 100 as embodied in FIG. 3. The illustrative view depicts an exemplary power distribution for the ratioed relationships of the first optical tap 304 through the fourth optical tap 310. The power values may differ for a number of reasons. For example, the power values may differ due to the number of optical fan-outs, the data rate, optical path distance, optical characteristics of the optical taps, or a combination thereof. The power values in this example are rounded off so they are approximate values. Additionally, when a tap is said to remove the same amount of power as another tap, for example 100 microwatts (μW), it is understood, there may be minor variation from the 100 (μW) that are within acceptable tolerance levels as determined by the link budget.

The illustrative view depicts the memory controller 102 of FIG. 3 outputting 1 milliwatt (mW) of optical energy into one of the egress optical interconnects 206 to the first optical tap 304 as the first input light 402. The first optical tap 304 splits the first input light 402 reflecting 100 (μW) in the first reflected light 406 and transmitting 900 μW in the first transmitted light 408 in accordance with its ratio power split relationship of 0.1 reflectivity to 0.9 transmissivity. The first transmitted light 408 represents the broadcast signal from the memory controller 102 passed through with a power loss of 100 μWs.

Continuing with this example, the second optical tap 306 inputs the 900 μW in the first transmitted light 408, from the first optical tap 304. The second optical tap 306 splits the first transmitted light 408 reflecting 100 microwatt (μW) in a second reflected light 502 and transmitting 800 μW in a second transmitted light 504 in accordance with its ratio power split relationship of 0.111 reflectivity to 0.889 transmissivity. The second transmitted light 504 represents the broadcast signal from the memory controller 102 passed through with a power loss of 200 μWs.

The third optical tap 308 inputs the 800 μW in the second transmitted light 504 from the second optical tap 306. The third optical tap 308 splits the second transmitted light 504, reflecting 100 μW in a third reflected light 506 and transmitting 700 μW in a third transmitted light 508 in accordance with its ratio power split relationship of 0.125 reflectivity to 0.875 transmissivity. The third transmitted light 508 represents the broadcast signal from the memory controller 102 passed through with a power loss of 300 μWs.

The fourth optical tap 310 inputs the 700 μW in the third transmitted light 508 from the third optical tap 308. The fourth optical tap 310 splits the third transmitted light 508, reflecting 100 μW in a fourth reflected light 510 and transmitting 600 μW in a fourth transmitted light 512 in accordance with its ratio power split relationship of 0.143 reflectivity to 0.857 transmissivity. The fourth transmitted light 510 represents the broadcast signal from the memory controller 102 passed through with a power loss of 400 μWs. In this example, 100 μW is used illustratively as the minimum power needed to maintain a reliable communication link. In this example, with a broadcast or multicast signal, the ratio relationship of the optical taps in the direction of signal travel increases in reflectivity and decreases in transmissivity from the first optical tap to the last optical tap.

The 600 μW in the fourth transmitted light 512 from the fourth optical tap 310 implies that more optical taps and more memory devices may be included in the path of the egress optical interconnects 206. On the other hand, the 600 μW in the fourth transmitted light 512 from the fourth optical tap 310 allows for the reduction of energy of the first input light 402 such that the fourth transmitted light 512 through the fourth optical tap 310 is zero or nearly zero with the fourth reflected light 510 approximately at 100 μW.

In an example for achieving minimum power consumption and satisfying a communication reliability metric, the optical interconnect system 100 may be adjusted such that the reflected portion and the transmitted portion at each of the optical taps from the first optical tap 304 through the fourth optical tap 310 provide the energy needed at each of the reflected portions while transmitting sufficient power to the rest of the optical tap chain.

For example, if the fourth optical tap 310 is the last optical tap in the egress optical interconnects 206, the optical interconnect system 100 is adjusted or designed such that the fourth transmitted light 512 is approximately zero. In addition, for this example, the controller light source 210 of FIG. 2 may be adjusted to output a lower power than the 1 mW illustrated for further reducing the power consumption.

For a return path illustration, one of the first memory devices 106 of FIG. 3 transmits information, such as command, data, or status, to the memory controller 102 over one of the ingress optical interconnects 204. Each of the first memory devices 106 is configured to transmit 1 mW of optical energy to its respective optical tap when transmitting. In this example, the return path depicts the reflected and transmitted signals for each optical tap traversed by a signal generated for the transmitting memory device 106. The fourth optical tap 310 receives a 1 mW light signal 513 carrying data converted from electrical form from its respective memory device 106. In accordance with the reflectivity/transmissivity ratio of 0.143/0.857 for this optical tap 310 and the direction of incidence of the light source signal, the 1 mW received light source signal is split producing an optical signal 532 receiving the reflectivity power portion, 0.143 for 143 μW, from the split which signal is diverted or reflected to one of the ingress optical interconnects 204, and the signal 515 receiving the transmissivity power portion, 0.857 or 857 μWs, is dropped. Conversely, instead of dropping this power, it can also be used to broadcast the return data to another optical interconnect bus. At the optical tap 308, the reflected signal of 143 μW received on the optical interconnect splits the signal according to its power ratio relationship so that a transmitted signal 518 of 0.875 of 143 μW or 125 μW is passed through on the optical interconnect path 204 while a reflected signal 516 of 0.125 of 143 μW or 17.9 μW is directed to a different path and dropped in this case. Similarly, optical tap 306 receives on the optical interconnect the transmitted signal 518 from tap 308 having power 125 μW and splits the signal 518 according to its power ratio relationship of 0.111/0.889 so that a transmitted signal 524 having 0.889 of 125 μW or 111 μW is passed through on the optical interconnect path 204 while a reflected signal 522 having 0.111 of 125 μW or 13.9 μW is directed to a different path and dropped in this case. Again, optical tap 304 receives the transmitted signal 524 of 111 μW from optical tap 306, via the optical interconnect and splits it in accordance with its ratio relationship of 0.1/0.9 so that a transmitted signal 530 of 0.9 of 111 μW or 100 μW is passed through on the optical interconnect to the optical receiver of the memory controller 102 while the other reflected signal 528 of 0.1 of 111 µW or 11 µW is directed to a different path and dropped. In the return path, the optical taps provide a ratioed relationship of decreasing reflectivity and increasing transmissivity for a signal generated from one of the devices to a specific target device such as a memory controller device.

In this example, if the third optical tap 308 had been coupled to a component sending a signal on the return path to the memory controller 102 (e.g. read data being sent), the third optical tap 308 receives a 1 mW light signal from a light source for its sender component. For this input light path, the reflected light signal would be 125 µW and would be sent on the return optical path while the transmitted signal of 875 µW would be dropped. Optical taps 306 and 304 would process the reflected 125 µW signal in the same manner as it processed the transmitted light signal 518 of 125 µW as in the example above.

In this example, if the second optical tap 306 had been coupled to a component sending a signal on the return path to the memory controller 102 (e.g. read data being sent), the second optical tap 306 receives a 1 mW light signal from a light source for its sender component. For this input light path, the reflected light signal would be 111 µW and would be sent on the return optical path while the transmitted signal of 889 µW would be dropped. Optical tap 304 would process the reflected 111 µW signal in the same manner as it processed the transmitted light signal 524 of 111 µW as in the example above.

In this example, if the first optical tap 304 had been coupled to a component sending a signal on the return path to the memory controller 102 (e.g. read data being sent), the first optical tap 304 receives a 1 mW light signal from a light source for its sender component. For this input light path, the reflected light signal would be 100 µW and would be sent on the return optical path to the memory controller 102 while the transmitted signal of 900 µW would be dropped.

As illustrated, the values of the reflectivity and transmissivity of each of the optical taps are identical whether used for broadcasting the first input light 402 or for the return path back to the memory controller 102.

The first optical interconnect 112 of FIG. 3 is described as the optical taps having a ratioed relationship with an increasing reflectivity and decreasing transmissivity from the first optical tap 304 to the fourth optical tap 310, outputting a predetermined reflected output from each of the optical taps. In this example, the reflected output from each of the optical taps is substantially the same in the egress direction and the same as the last output in the ingress direction.

Referring now to FIG. 6, therein is shown a flow chart of a method 600 for communication between optically interconnected computer system components in accordance with an embodiment of the present invention. This method can be used with one or more of the system embodiments discussed above. The method 600 includes a first tap (e.g., 310) removing the same amount of power as a second tap (e.g. 308) from a signal received from the optical data communication path which signal is traveling in one direction on the path in accordance with the first tap's power ratio relationship 602. Alternatively, the taps can remove a same minimum amount of power, but there can be further variation with some devices receiving more overall power. The first tap passes through on the optical data communication path the remainder of the broadcast signal as an optical signal with a second power, the second power also being determined by the first tap's power ratio relationship 604. As illustrated in the example of FIG. 3, the power ratio relationships are different. As the signal passively passes through the taps on the optical path, it is losing more and more power so the power received at each tap is different. Thus, to obtain a minimum power requirement for the optical receiver or photodetector for each component, the power ratio at each tap draws a different percentage of power from the signal it receives from the sender broadcasting or multicasting device. The method further comprises the first tap removing a different amount of power than a second tap from a pass through signal received from the optical data communication path which is traveling in an opposite direction in accordance with the first tap's same ratio relationship 606. The ratio relationship at each tap is such that an optical receiver for a destination computer system component receives the same amount of power in a signal independent of which light source for a sender computer system component generated the signal.

Figure 7A:
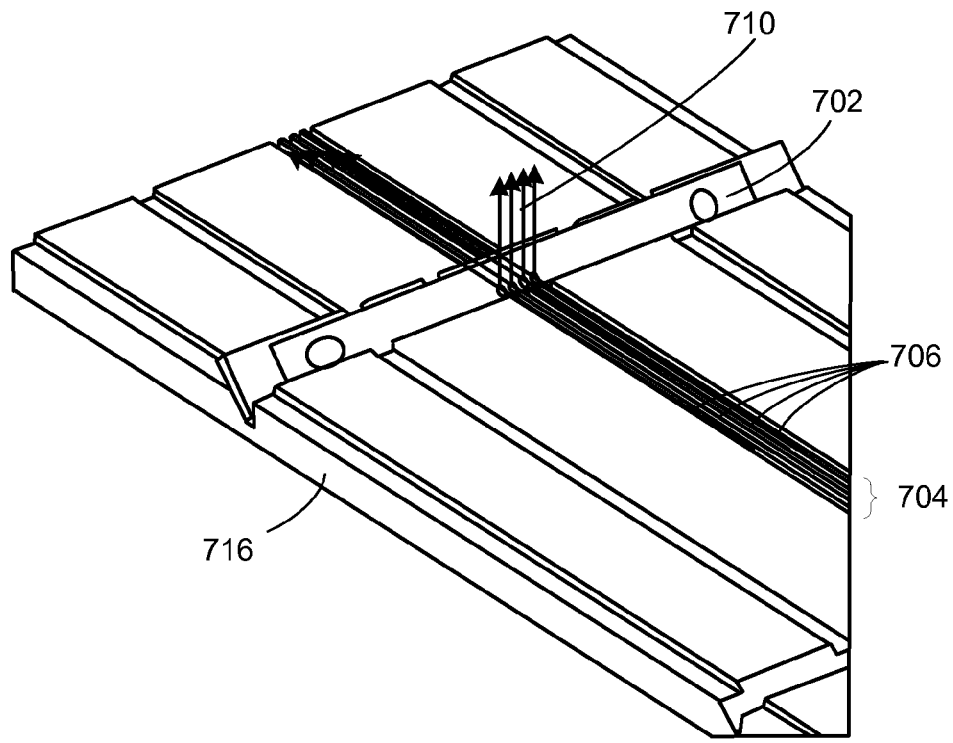
FIG. 7A is a view of an example of a single optical tap which intersects optical paths carrying ingress and egress optical signals, this example illustrating splitting of egress optical signals, which embodiment can be used in one or more embodiments of the invention.

FIG. 7A is a view of an example of a single optical tap which intersects optical paths carrying ingress and egress optical signals, this example illustrating splitting of egress optical signals, which embodiment can be used in one or more embodiments of the invention. An optical beam splitter 702 is inserted at an angle into optical interconnects 704. This can be implemented with light pipes such as for example hollow metal waveguides. These light pipes are hollow pipes with a metal coating on the inside of the pipe which guides light with low loss, and the optical taps can be inserted into them by cutting slots. The optical interconnects 704 in this example carry egress optical signals 706. For example, such an arrangement is suitable for use with an optically interconnected memory system. In the figure, the optical beam splitter is inserted at about a 45 degree angle. The beam splitter 702 can be a pellicle beam splitter, and the optical interconnects 704 can be implemented as hollow metal waveguides. In the egress path, the reflected light 710 is sent to an optical receiver for the optically coupled memory device (see FIGS. 2 and 3), and the light having a power proportional to the transmissivity value is passed through to be received by the next optical tap.

Figure 7B:
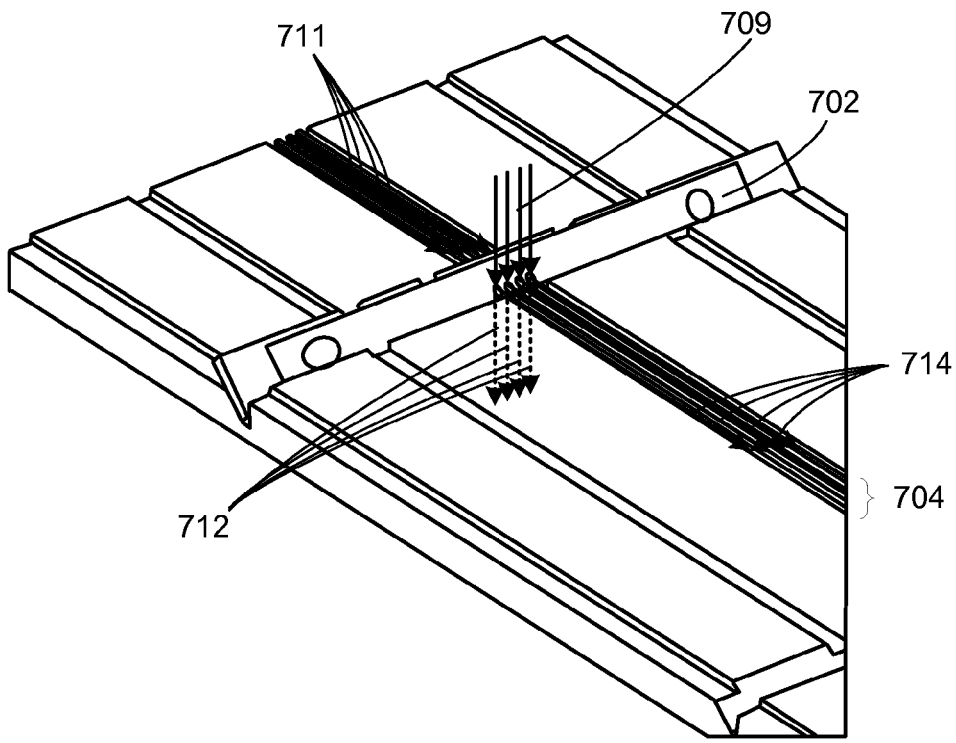
FIG. 7B is a view of an example of a single optical tap which intersects optical paths carrying ingress and egress optical signals, this example illustrating splitting of ingress optical signals, which embodiment can be used in one or more embodiments of the invention.

FIG. 7B is a view of an example of a single optical tap which intersects optical paths carrying ingress and egress optical signals, this example illustrating splitting of ingress optical signals, which embodiment can be used in one or more embodiments of the invention. On the return path, the input light 709 (e.g., from a light source of a memory device as discussed in FIG. 5B) is split into a light 712 having power proportional to the transmissivity value and light 714 having power proportional to the reflectivity value which is passed through to the next optical tap on the return path. The light 712 is dropped by getting absorbed in the substrate 716. Similarly, ingress optical signals 711 received on the optical interconnects are split by the optical tap 702 such that light having power proportional to the transmissivity value is passed through (e.g. 714) and light having power proportional to the reflectivity value is dropped (e.g. 712). In this way, the same optical tap is used on the return path. Using this configuration, in the example of FIG. 3, the same optical tap is used for the ingress and egress directions intersecting both the both northbound and southbound or ingress and egress waveguides, respectively. The nearest of the first memory devices 106 to the memory controller 102 uses the first optical tap 304 to tap light both for northbound and southbound paths.

Another aspect of the present invention provides optical interconnects with optical taps having a graded or ratioed relationship with an increasing reflectivity and decreasing transmissivity from the first optical tap to the last optical tap in a direction of broadcast or multicast signal travel outputting a predetermined reflected output from each of the optical taps. In this example, the reflected output from each of the optical taps is substantially the same in the egress direction and the same last output in the ingress direction. Additionally, the optical taps provide a ratioed relationship of decreasing reflectivity and increasing transmissivity in a return path for a signal generated from one of the devices to a specific target device such as a memory controller device. The ratioed relationship allows for a given optical power from the first input light and a given receiver sensitivity. A number of optical fan-outs may be determined or calculated ensuring a predetermined communication reliability. Alternatively, the optical power from the first input light may be reduced for a predetermined optical power for minimizing power consumption.

Embodiments of the invention can be used to address problems particularly in memory systems. For example, in the typical example discussed above of bulk memory DIMM technology with a series of DRAMs using a parallel memory bus, the high speed of an optical interconnect enhances scalability overcoming the electrical scaling problems so that data can be transferred much faster and the maximum number of DIMMs can be significantly increased over an electrical system. In the example using FBDIMM technology which replaced the wide parallel bus with narrow serial point-to-point links, the memory controller can still electronically serialize the data which is modulated onto an optical signal to be sent to the memory devices (e.g. 106) and can arbitrate which device gets control of the return path; however, the optical interconnect system provides an optical bus over which a signal can be broadcast or multi-cast. Thus, each intermediate memory buffer in this example can perform serial to parallel conversion and vice versa for data intended for or sent from its associated DRAM, but the memory buffer does not need to replicate and forward data for an adjacent buffer. The adjacent memory device receives the broadcast signal as well. Thus hops are avoided with their accompanying latency.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An optical interconnect system comprising:
   an optical data communication path to communicatively couple first and second memory devices to a memory controller, the memory controller to communicate with the first and second memory devices at a same optical wavelength;
   a first optical tap to communicatively couple the first memory device to the optical data communication path, the first optical tap to split a first optical signal into a second optical signal having a first power and a third optical signal having a second power in accordance with a first power ratio relationship between reflectivity and transmissivity of the first optical tap at the optical wavelength; and
   a second optical tap to communicatively couple the second memory device to the optical data communication path, the second optical tap to split the third optical signal into a fourth optical signal having a third power and a fifth optical signal having a fourth power in accordance with a second power ratio relationship between reflectivity and transmissivity of the second optical tap at the optical wavelength, the first and second ratio relationships of being selected to have different values to adjust the first power to be substantially equal to the third power.

2. The optical interconnect system of claim 1, wherein the optical data communication path comprises one or more hollow metal waveguides.

3. The optical interconnect system of claim 2, wherein the first optical tap comprises a pellicle beam splitter to intersect at least one of the one or more hollow metal waveguides.

4. The optical interconnect system of claim 1, wherein the optical data communication path comprises an ingress optical path and an egress optical path defined with respect to at least one of the first memory device, the second memory device or the memory controller.

5. The optical interconnect system of claim 4, wherein the first optical tap intersects both the ingress optical path and the egress optical path, the single optical tap to split an optical signal on either path in accordance with the first power ratio relationship.

6. The optical interconnect system of claim 1, further comprising an adjustment device associated with the first optical tap, the adjustment device to, when the first memory device is not installed, automatically adjust the first optical tap to not split the power of the first optical signal into the second optical signal.

7. The optical interconnect system of claim 6, wherein the adjustment device adjusts the first optical tap by at least one of removing the first optical tap from an optical path of the first optical signal or adjusting an electronically-controllable reflectivity of the first optical tap.

8. The optical interconnect system of claim 1, further comprising an adjustment device associated with the first optical tap, the adjustment device to, when the first memory device is inserted, automatically adjust an angle of the first optical tap to split the power of the first optical signal into the second optical signal.

9. The optical interconnect system of claim 8, wherein the adjustment device comprises a microelectromechanical system.

10. The optical interconnect system of claim 1, wherein the first optical tap comprises a passive optical tap.

11. The optical interconnect system of claim 1, wherein the optical data communication path comprises an optical interconnect bus.

12. The optical interconnect system of claim 1, wherein the first and second ratio relationships are selected during at least one of design or manufacturing of the optical interconnect system.

13. The optical interconnect system of claim 1, wherein the first ratio relationship is selected by adjusting an electronically-controllable reflectivity of the first optical tap.

14. The optical interconnect system of claim 1, wherein first memory device is to be communicatively coupled to the second optical signal, and the second memory device is to be communicatively coupled to the fourth optical signal.

15. The optical interconnect system of claim 1, further comprising an optical receiver associated with the first memory device, the first power being adjusted based on a sensitivity of the optical receiver and a bit error-rate.

16. The optical interconnect system of claim 1, the first and second ratio relationships being selected so that the second optical tap has increased reflectivity and decreased transmissivity with respect to the first optical tap.

* * * * *